Figure 1:
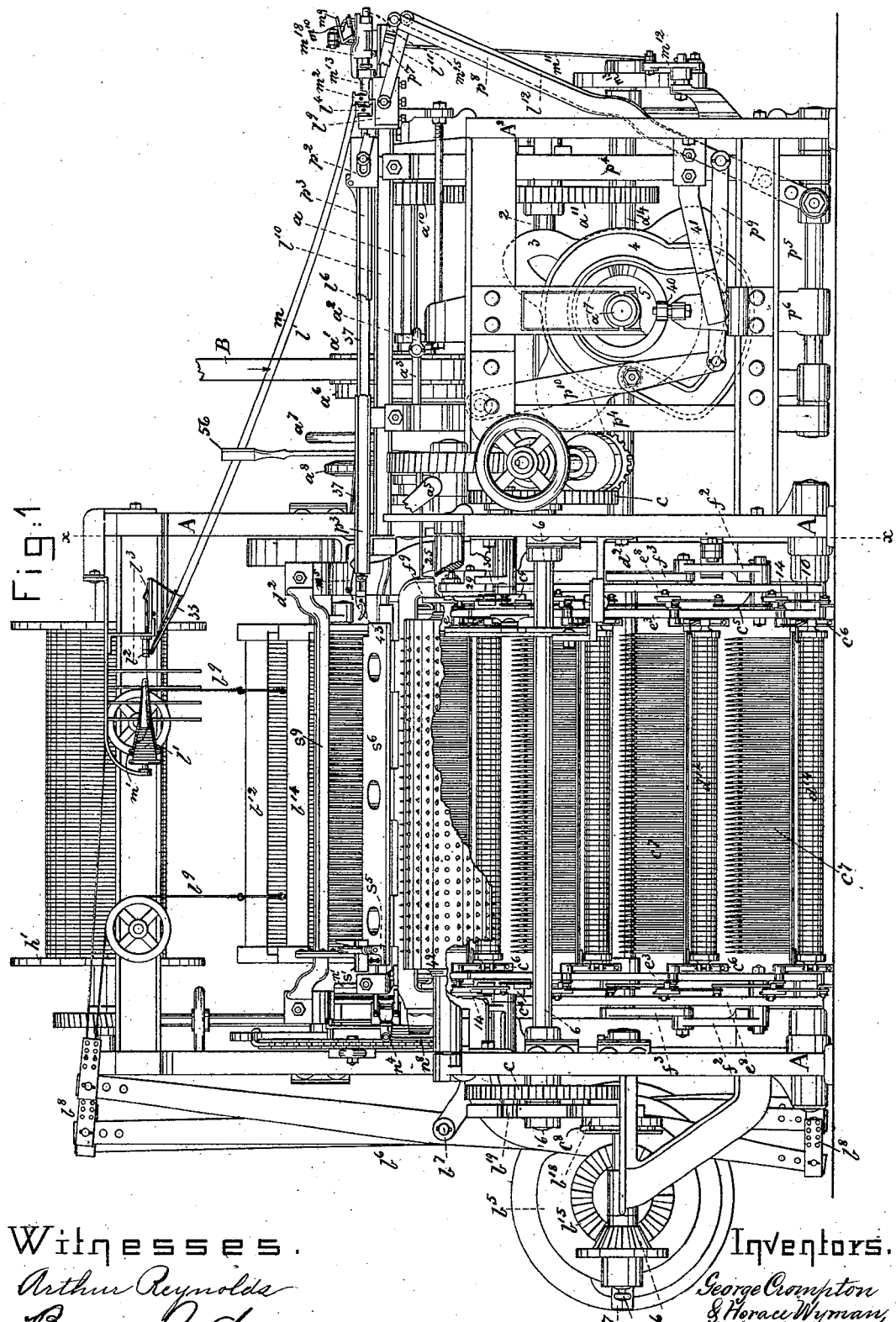

(No Model.) 14 Sheets—Sheet 1.

G. CROMPTON & H. WYMAN.
LOOM FOR WEAVING TUFTED FABRICS.

No. 245,259. Patented Aug. 2, 1881.

Witnesses.
Arthur Reynolds
Bernice J. Noyes

Inventors.
George Crompton
& Horace Wyman,
by Crosby & Gregory, Attys.

(No Model.) 14 Sheets—Sheet 8.
G. CROMPTON & H. WYMAN.
LOOM FOR WEAVING TUFTED FABRICS.
No. 245,259. Patented Aug. 2, 1881.

Witnesses.
Arthur Reynolds
Bernice J. Noyes.

Inventors.
George Crompton & Horace Wyman
by Crosby Gregory Attys.

(No Model.) 14 Sheets—Sheet 5.
G. CROMPTON & H. WYMAN.
LOOM FOR WEAVING TUFTED FABRICS.

No. 245,259. Patented Aug. 2, 1881.

Witnesses.
Arthur Reynolds
Bernice J. Noyes

Inventors.
George Crompton & Horace Wyman
by Crosby & Gregory Attys.

(No Model.) 14 Sheets—Sheet 6.
G. CROMPTON & H. WYMAN.
LOOM FOR WEAVING TUFTED FABRICS.
No. 245,259. Patented Aug. 2, 1881.

Witnesses
Arthur Reynolds
Bernice J. Noyes

Inventors.
George Crompton & Horace Wyman
by Crosby & Gregory Attys.

(No Model.) 14 Sheets—Sheet 7.
G. CROMPTON & H. WYMAN.
LOOM FOR WEAVING TUFTED FABRICS.
No. 245,259. Patented Aug. 2, 1881.
Fig. 11.
Fig. 12.
Fig. 13.
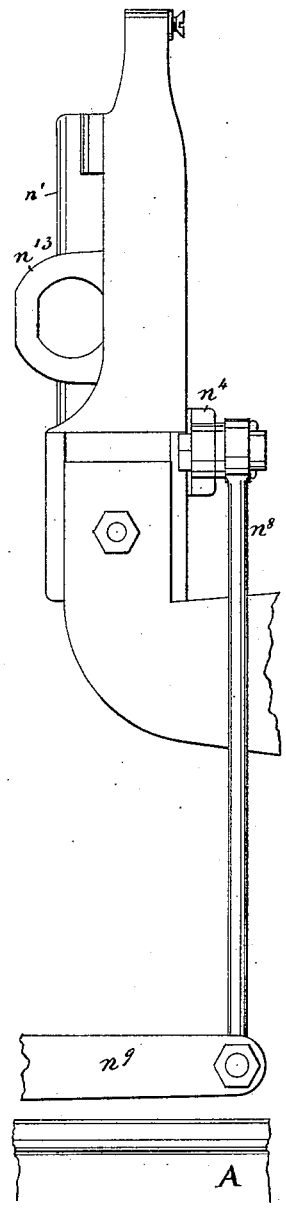
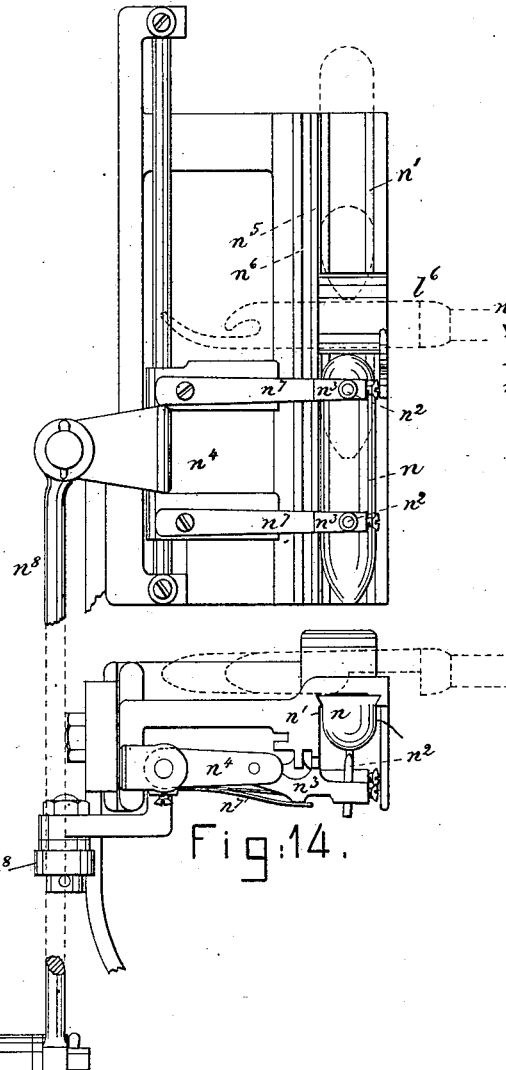
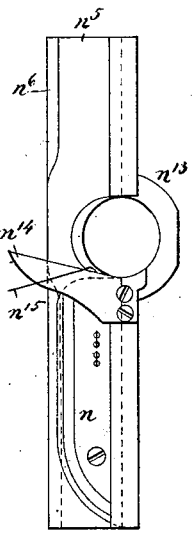
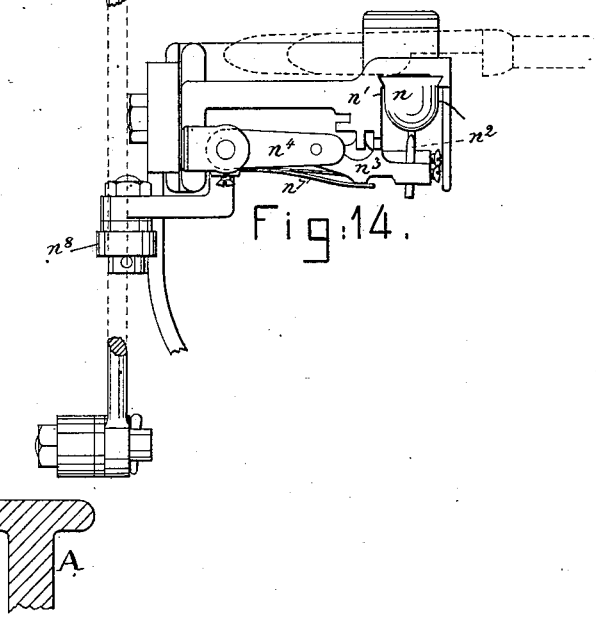
Fig. 14.
Witnesses.
Arthur Reynolds
Bernice J. Noyes
Inventors.
George Crompton & Horace Wyman
by Crosby & Gregory Attys.

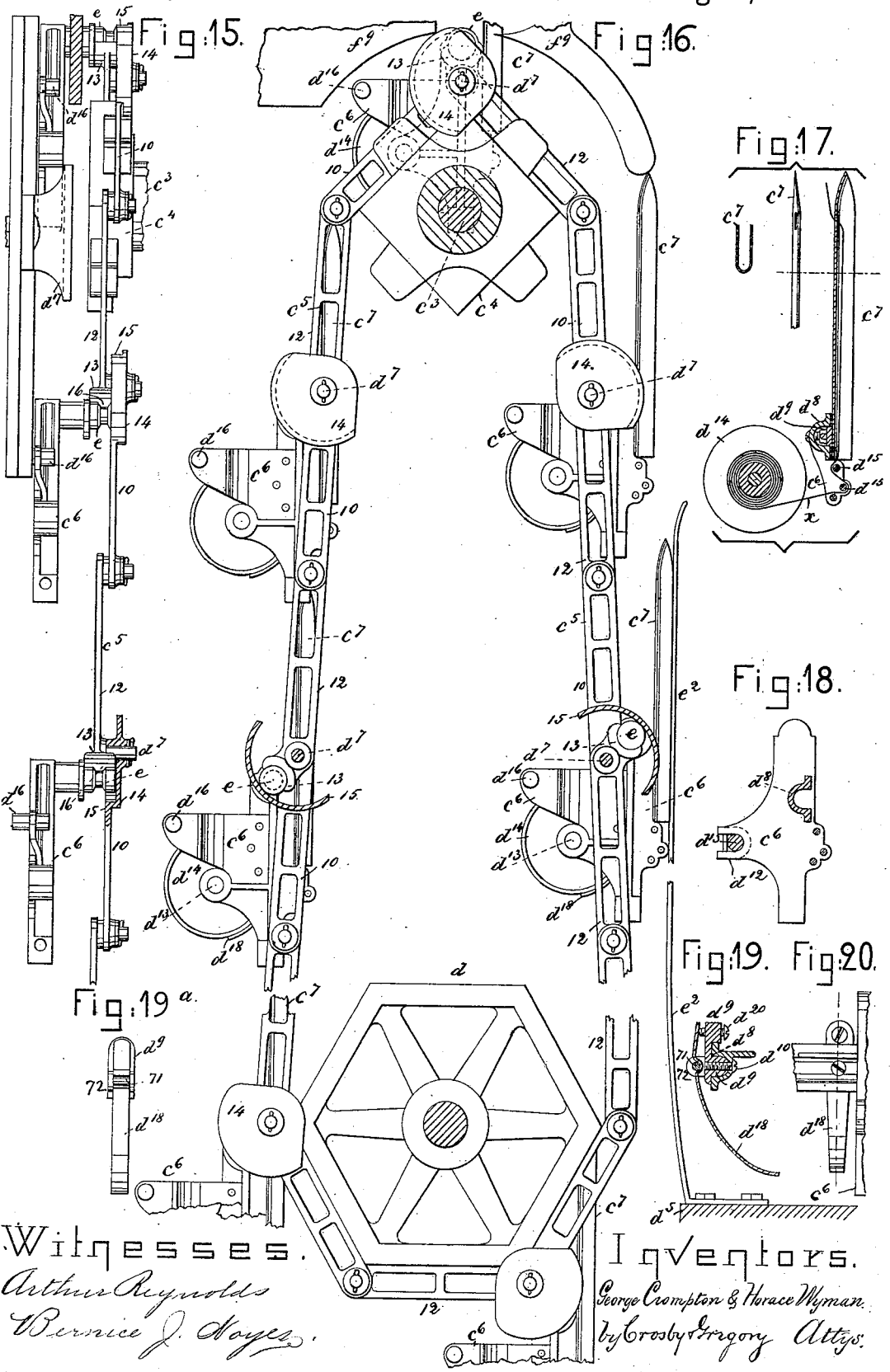

(No Model.) 14 Sheets—Sheet 9.

G. CROMPTON & H. WYMAN.
LOOM FOR WEAVING TUFTED FABRICS.

No. 245,259. Patented Aug. 2, 1881.

Witnesses.
Arthur Reynolds
Bernice L. Noyes

Inventors.
George Crompton & Horace Wyman,
by Crosby & Gregory Attys.

(No Model.) 14 Sheets—Sheet 10.

G. CROMPTON & H. WYMAN.
LOOM FOR WEAVING TUFTED FABRICS.

No. 245,259. Patented Aug. 2, 1881.

Fig. 27.ᵃ

Witnesses.
Arthur Reynolds
Bernice J. Noyes

Inventors.
George Crompton & Horace Wyman
by Crosby & Gregory Attys.

N. PETERS. Photo-Lithographer, Washington, D. C.

(No Model.) 14 Sheets—Sheet 11.

G. CROMPTON & H. WYMAN.
LOOM FOR WEAVING TUFTED FABRICS.

No. 245,259. Patented Aug. 2, 1881.

Witnesses.
Arthur Reynolds
Bernice J. Noyes.

Inventors.
George Crompton & Horace Wyman
by Crosby & Gregory Attys.

(No Model.) 14 Sheets—Sheet 12.
G. CROMPTON & H. WYMAN.
LOOM FOR WEAVING TUFTED FABRICS.
No. 245,259. Patented Aug. 2, 1881.
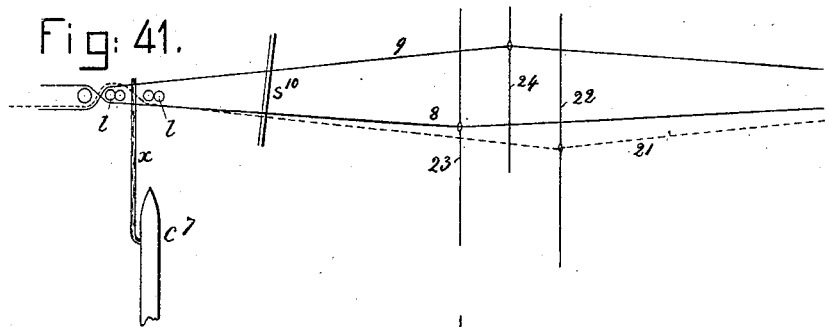
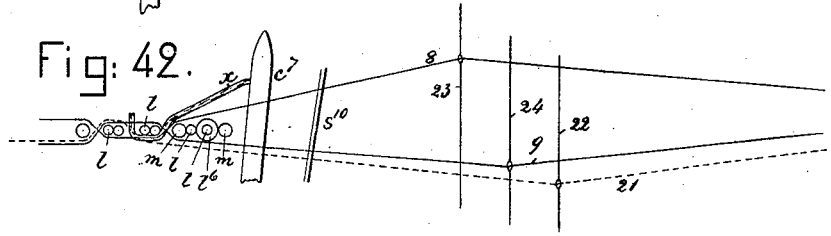
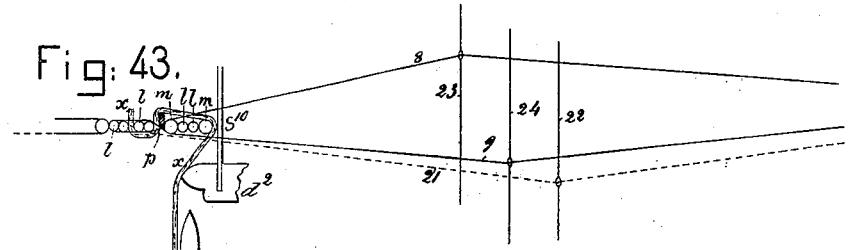
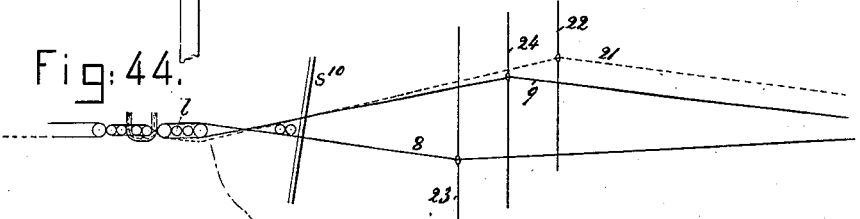
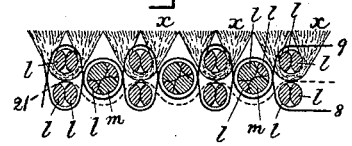
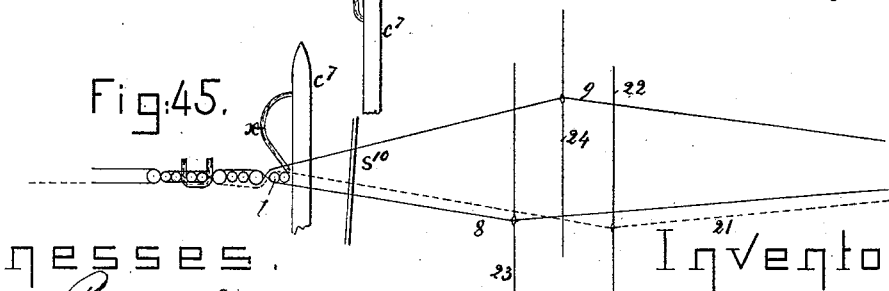
Witnesses.
Arthur Reynolds
Bernice J. Noyes
Inventors.
George Crompton & Horace Wyman
by Crosby & Gregory Attys.

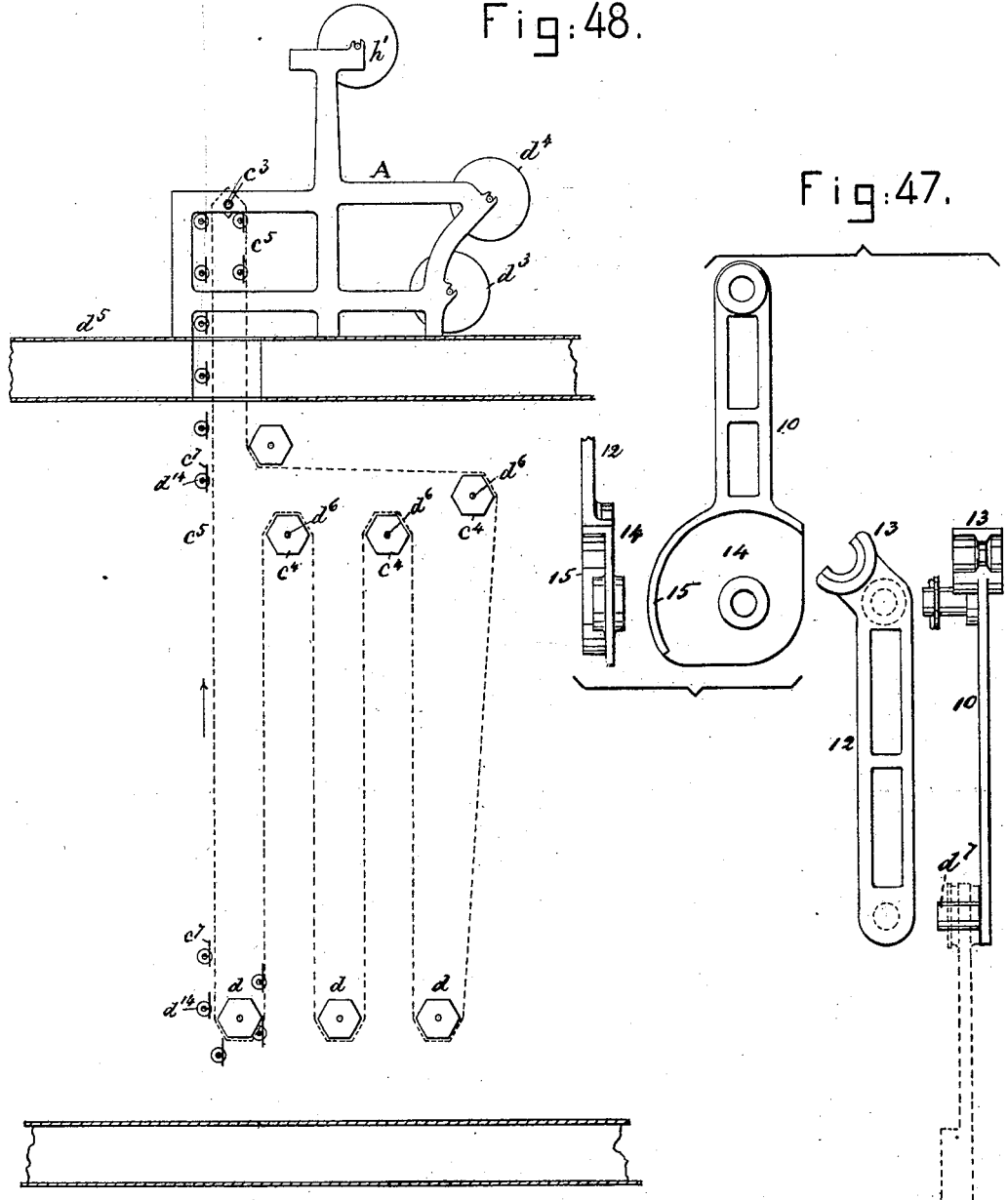

(No Model.) 14 Sheets—Sheet 14.
G. CROMPTON & H. WYMAN.
LOOM FOR WEAVING TUFTED FABRICS.
No. 245,259. Patented Aug. 2, 1881.
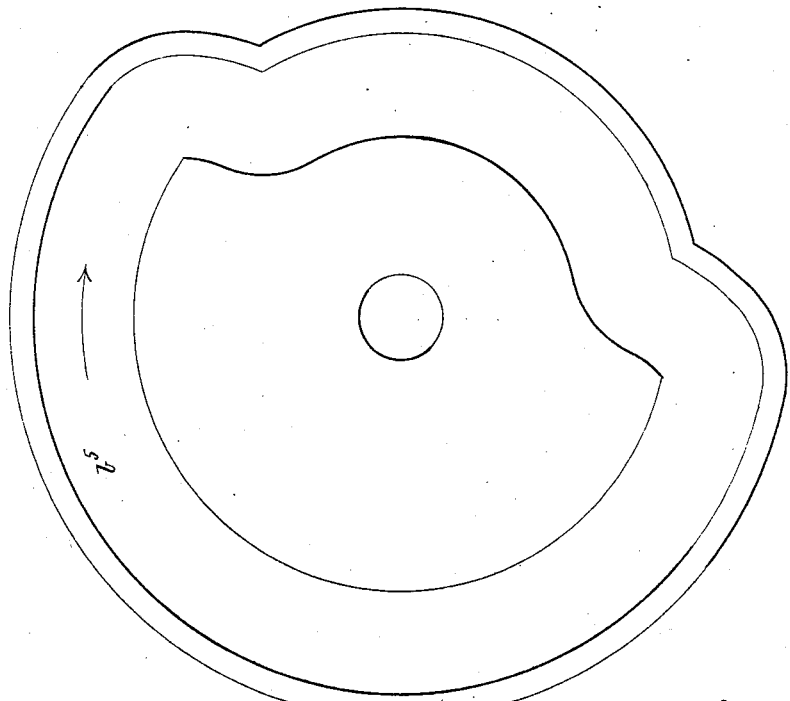
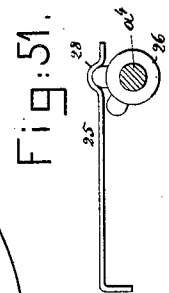
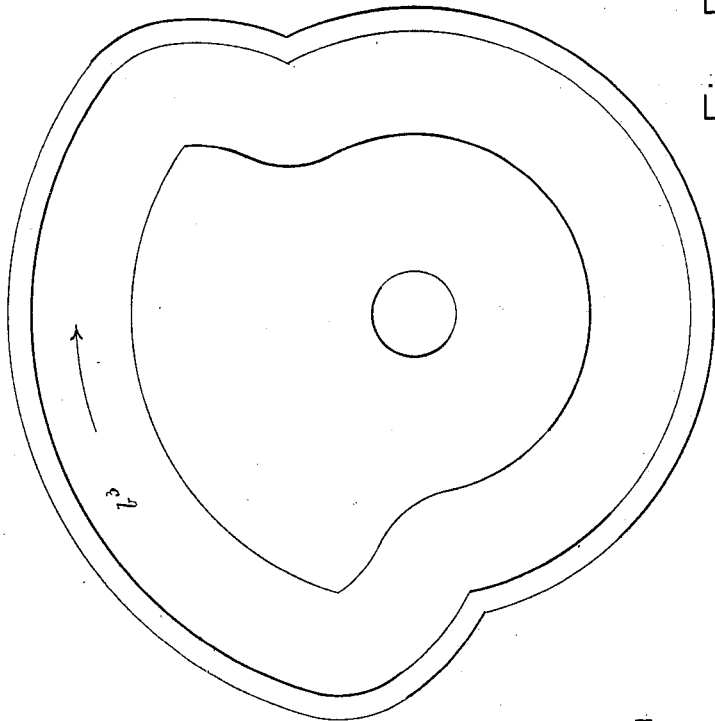
Witnesses.
Arthur Reynolds
Bernice J. Noyes
Inventors.
George Crompton & Horace Wyman
by Crosby & Gregory Attys.

UNITED STATES PATENT OFFICE.

GEORGE CROMPTON AND HORACE WYMAN, OF WORCESTER, MASSACHUSETTS, SAID WYMAN ASSIGNOR TO SAID CROMPTON.

LOOM FOR WEAVING TUFTED FABRICS.

SPECIFICATION forming part of Letters Patent No. 245,259, dated August 2, 1881.

Application filed March 28, 1881. (No model.)

*To all whom it may concern:*

Be it known that we, GEORGE CROMPTON and HORACE WYMAN, of Worcester, county of Worcester, and State of Massachusetts, have invented Improvements in Looms for Weaving Tufted Fabrics, of which the following description, in connection with the accompanying drawings, is a specification.

This invention relates to improvements in that class of looms described in English Patent No. 2,095, July 11, 1872, designed for weaving tufted fabrics chiefly used for carpets, rugs, &c. The tufted fabric, if a carpet, will be of the class denominated "moquette," wherein the separate tufts composing the fabric are locked about a tufting-weft, instead of about the warp, as in Axminster carpets.

The improvements herein described have for their object to simplify and improve the mechanical construction of this class of looms, wherein needles are employed for the introduction of the tufts between the warp-threads and about the weft, our object being to cheapen the construction of the mechanism, simplify the working parts, make them more durable and certain in operation, and increase the speed at which the loom may be run practically.

Our invention consists of endless open-linked chains located below the warp and a series of eye-pointed tufting-needles and spools and tufting-carriages for them, combined with means to remove the said carriages from and return them again to the said chains; also, in the combination, with the endless open-linked chains for moving the tufting-carriages, of means for actuating the chains intermittingly at a variable speed, whereby the chains and carriages are started slowly, then moved more rapidly, and on approaching the end of their movement have their speed gradually decreased; also, in the combination, with the endless open-linked chains for moving the carriages, of means to disconnect the said chains from those parts of the loom which give motion to the chains, whereby the said chains may be left free to be turned backward or forward independently, while other parts of the loom, such as the shedding mechanism, remain at rest, to thus enable the chains which carry the tufting-carriages to be reversed to correct imperfections in weaving, thereby enabling the pattern in the fabric to be correctly preserved under all circumstances; also, in improvements in the method of attaching the tuft-yarn needles to the sectional plates of the carriages, whereby, should a needle become bent or injured, the same may be quickly replaced without disturbing the whole series of needles of that carriage; also, in a supplemental weft-carrier for the coarse weft, combined with means, substantially as described, for connecting it with and disconnecting it from the weft-carriage which actuates the tuft-weft carrier; also, in mechanical details and combinations thereof, as hereinafter more fully described, and pointed out in the claims at the end of this specification.

Figure 2:
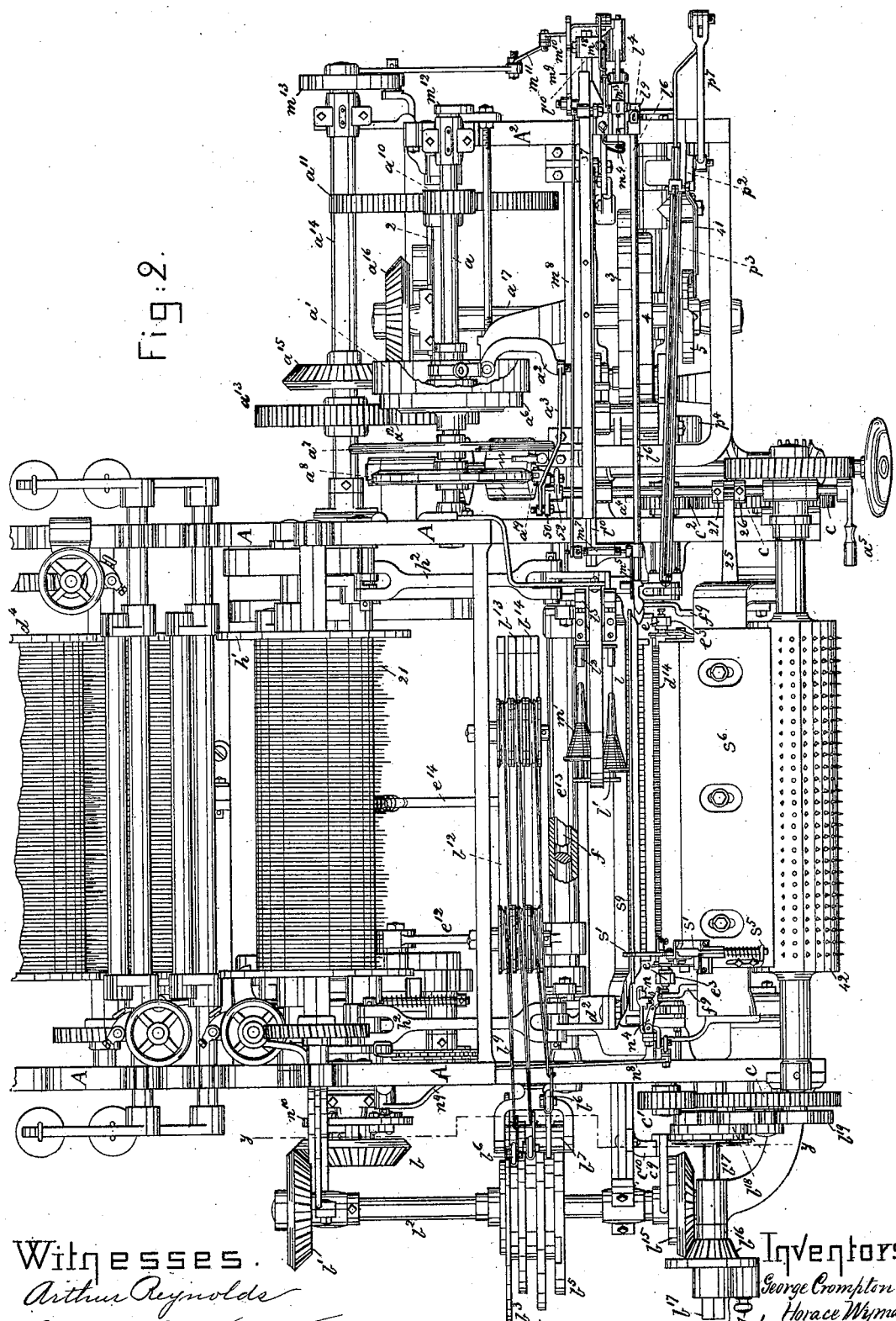
Figure 3:
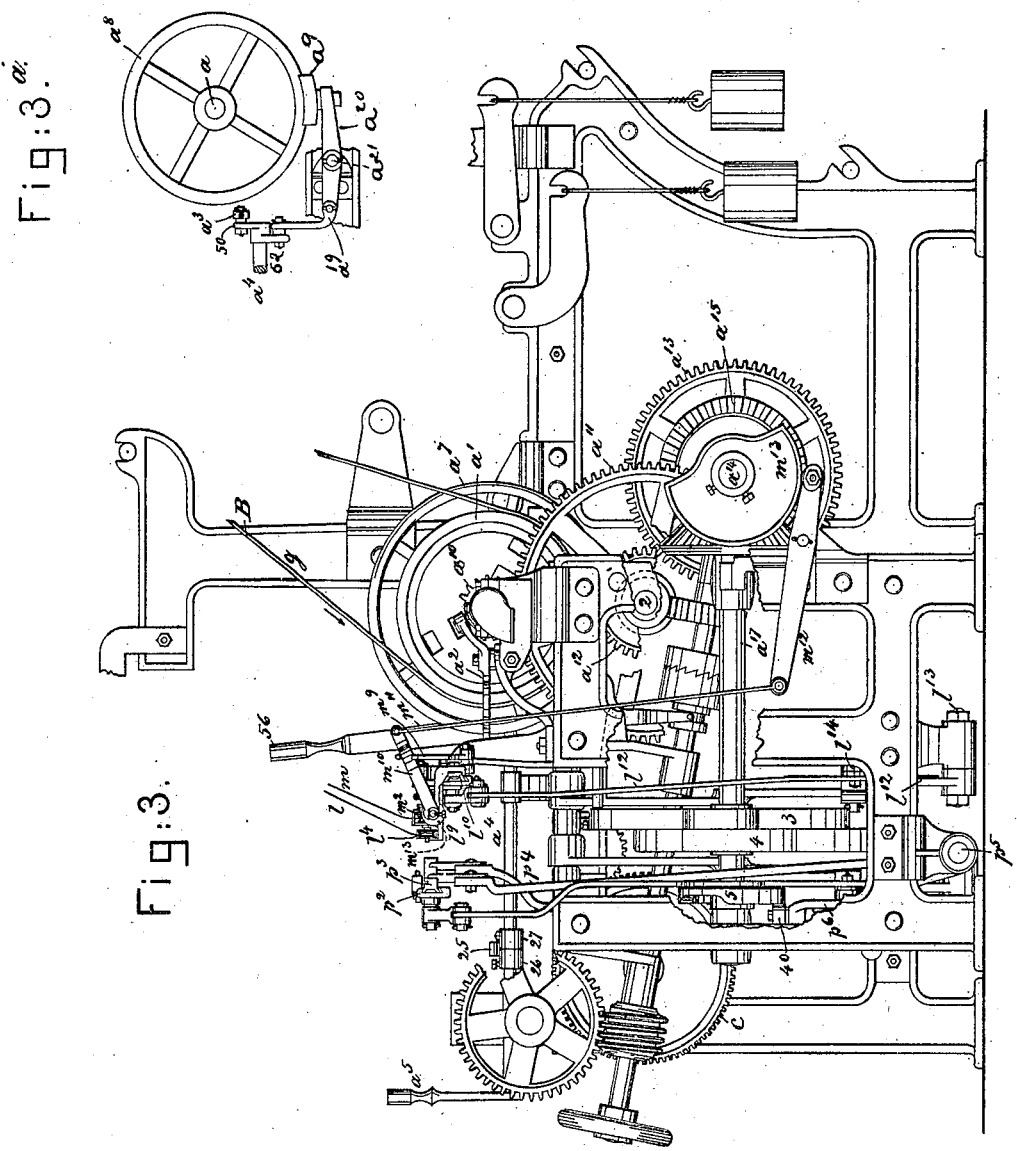
Figure 4:
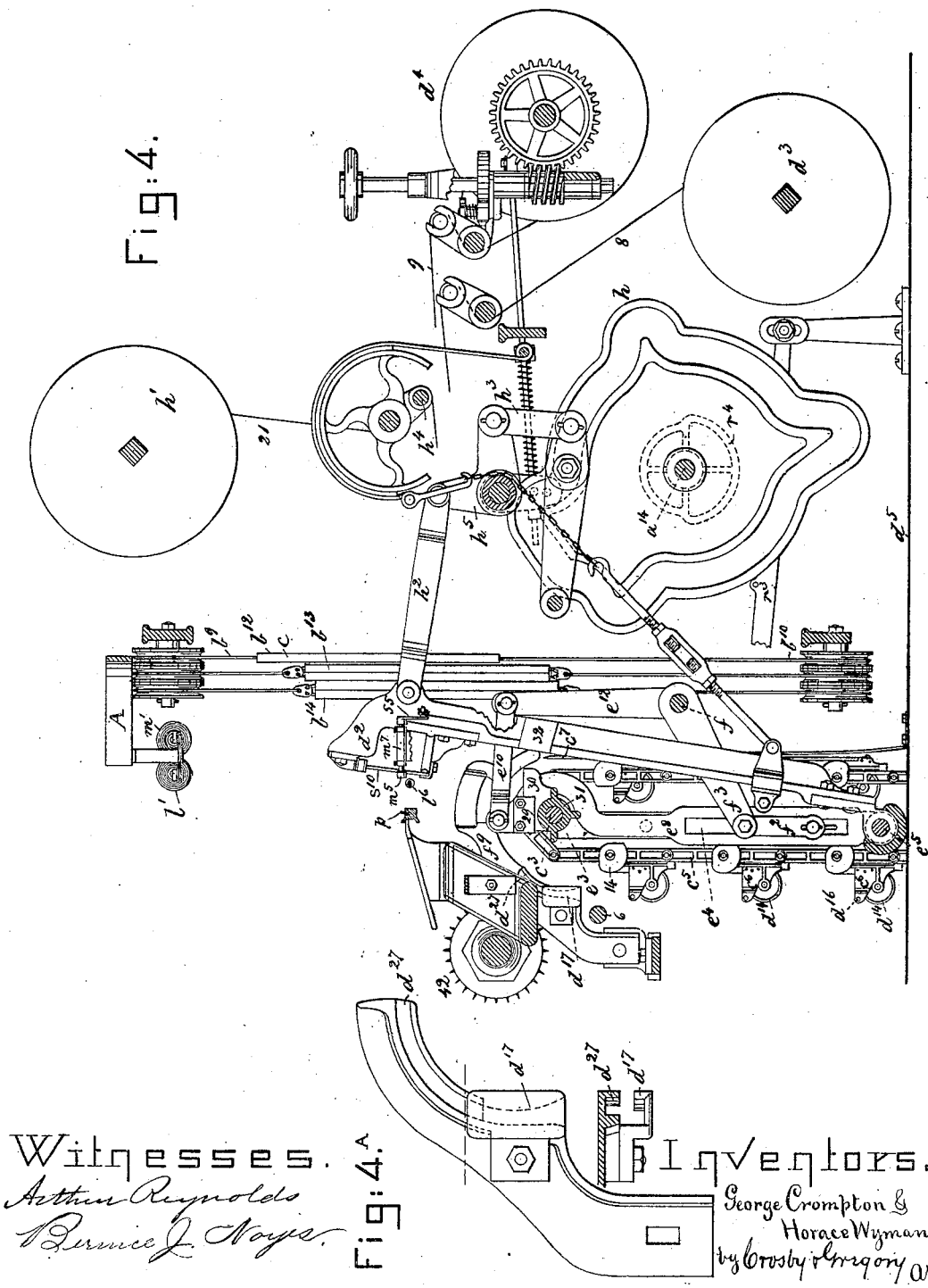
Figure 5:
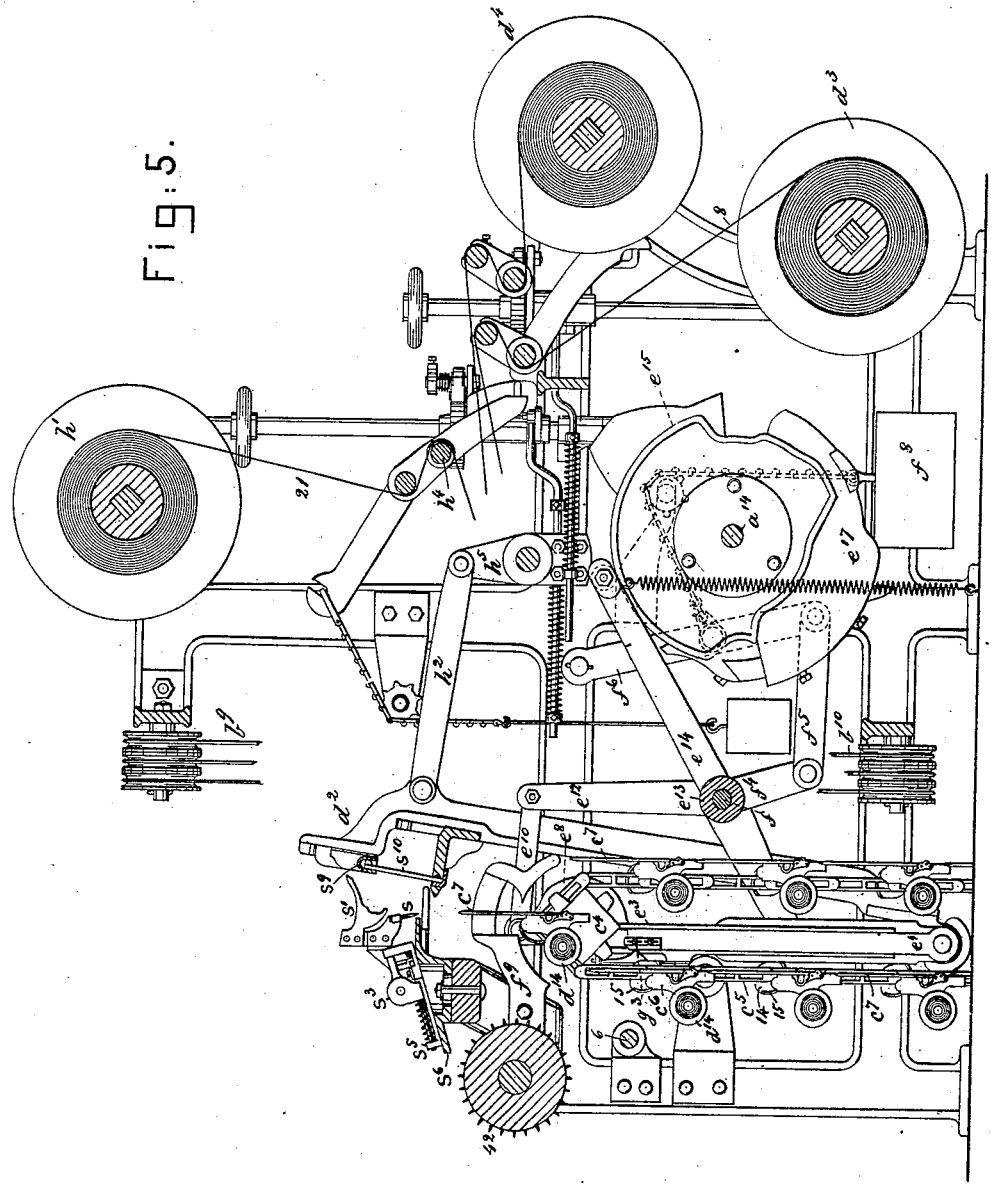
Figure 6:
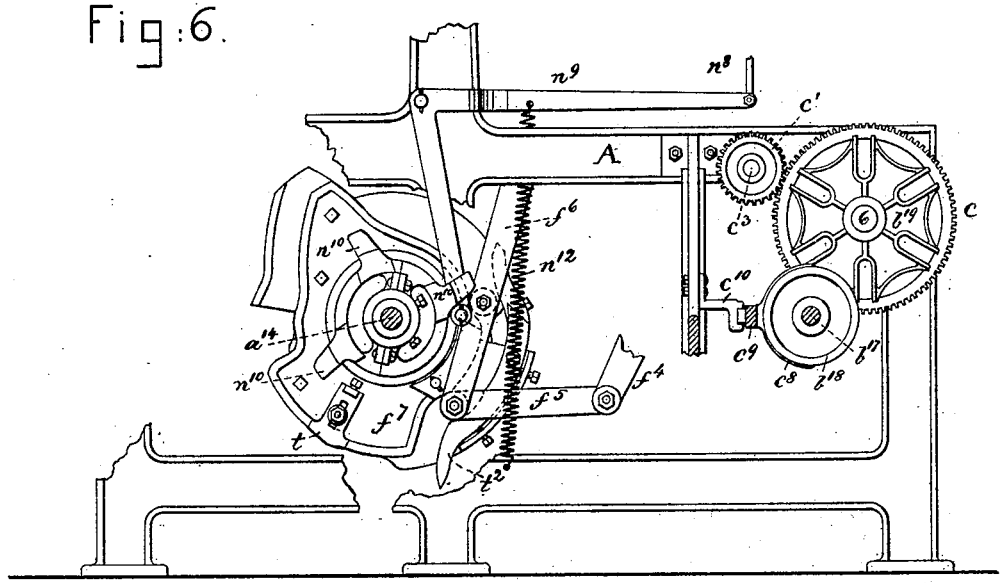
Figure 7:
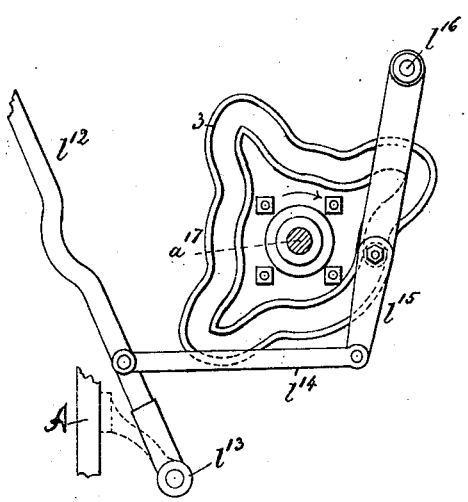
Figure 8:
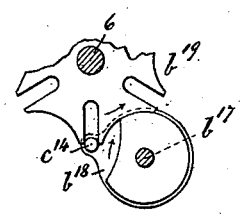
Figure 9:
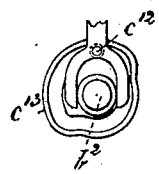
Figure 10:
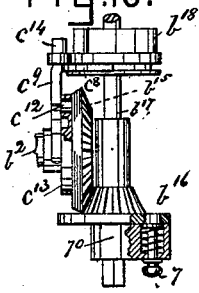
Figure 21:
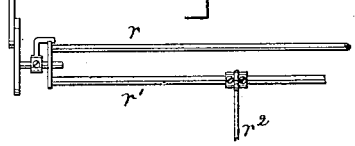
Figure 22:
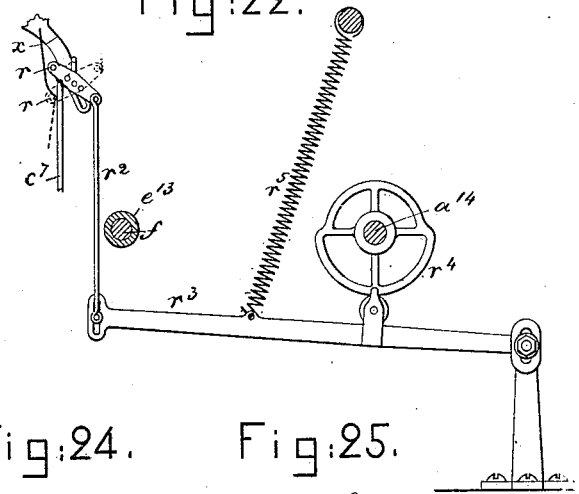
Figure 23:
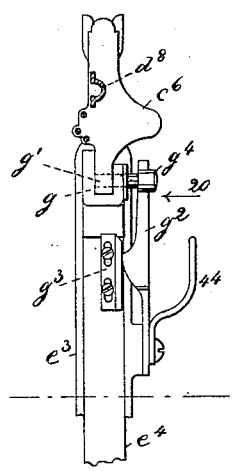
Figure 24:
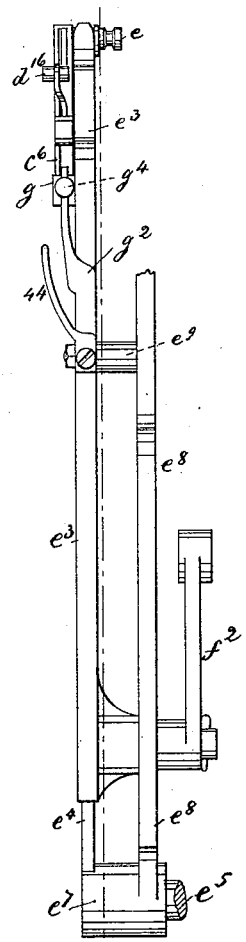
Figure 25:
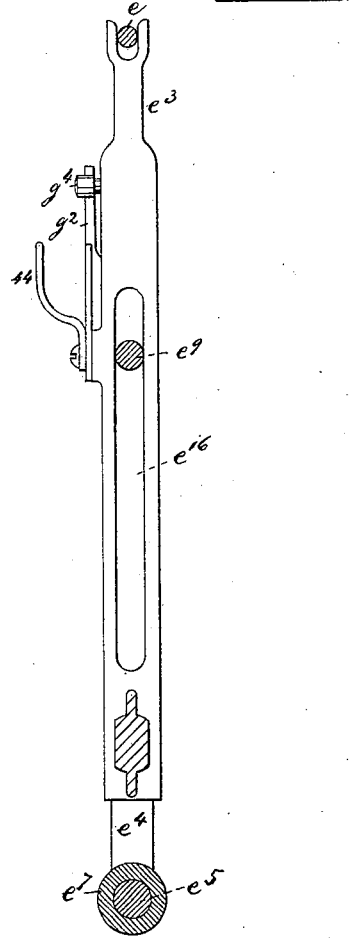
Figure 26:
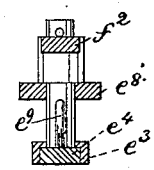
Figure 27:
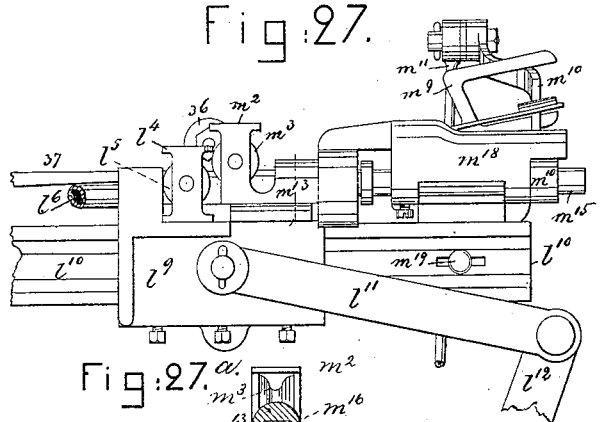
Figure 28:
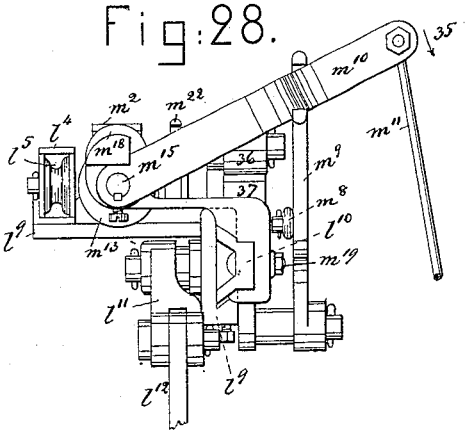
Figure 29:
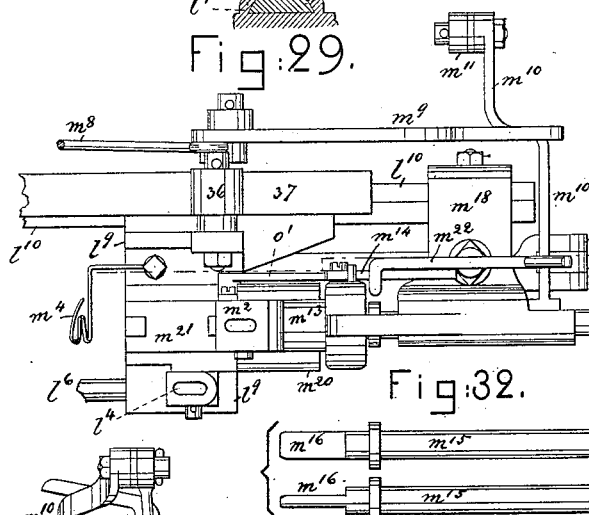
Figure 30:
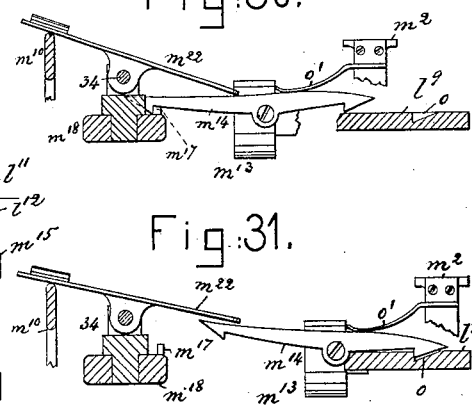
Figure 31:
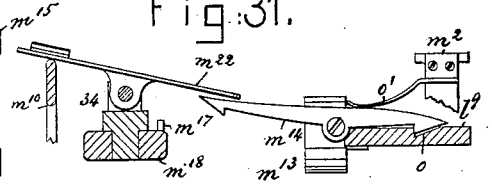
Figure 32:
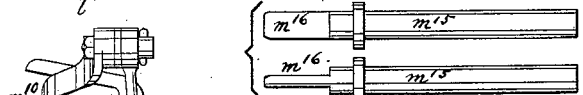
Figure 33:
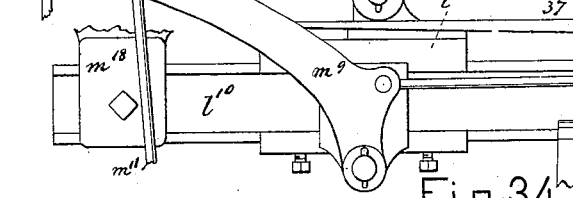
Figure 34:
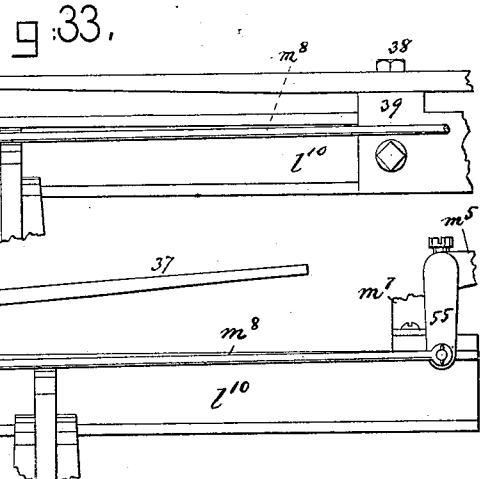
Figure 35:
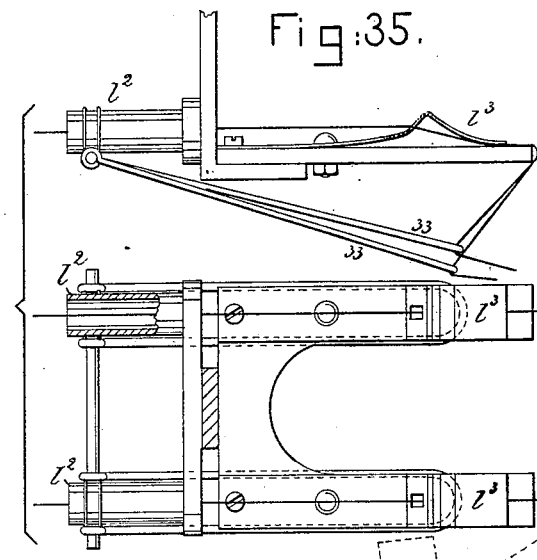
Figure 36:
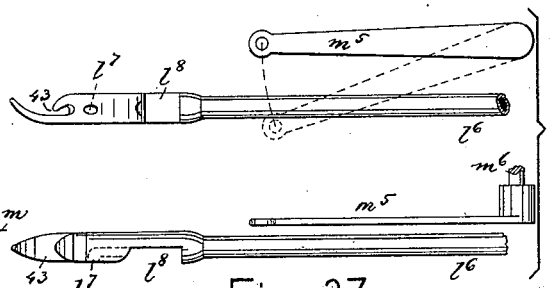
Figure 37:
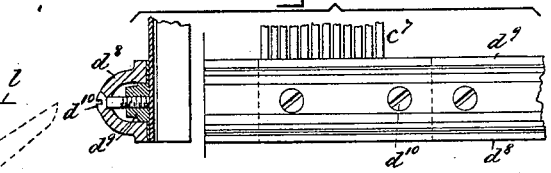
Figure 38:
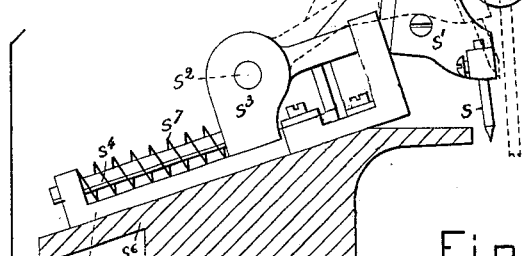
Figure 39:
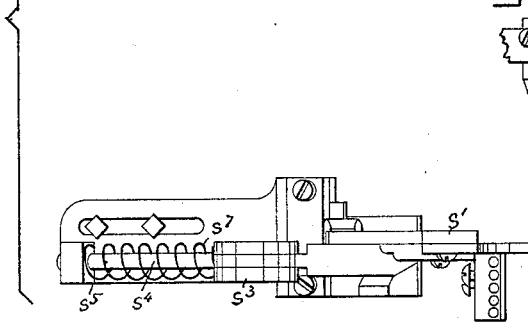
Figure 40:
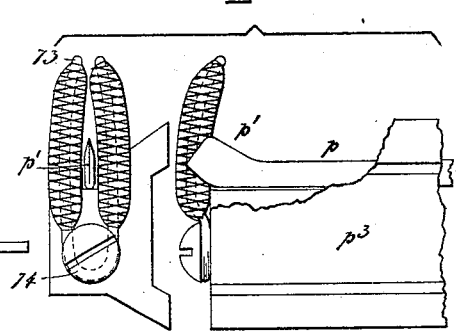

Figure 1 is a partial front elevation of a loom containing our invention, the take-up roll being partially broken out, as well as the guide for the pile-wire carriage and the link for moving it. The shaft $a^{14}$, only partially shown in Fig. 1, is fully shown in Figs. 2 and 3. Fig. 2 is a top view of Fig. 1, a portion of the rear of the loom being broken out, as well as parts of the friction or clutch driving pulleys, and of the rocking sleeve and shaft within it, the parts broken out in Fig. 1 being shown unbroken in Fig. 2. Fig. 3 is a right-hand side elevation of the parts outside the regular loom-side, it showing chiefly the mechanism for driving the loom and for moving the weft-carriers and pile-wire. Fig. $3^{a}$ is a detail showing the brake as applied to the brake-wheel. Fig. 4 is a sectional elevation in the line $x$, Fig. 1, it showing the parts between such line and the center of the loom. Fig. $4^{a}$ shows enlarged details of the guides $d^{17}$, which receive the studs $d^{16}$ of the carriages $c^{6}$. Fig. 5 is a vertical central section, looking toward the left of the loom, and showing the parts between the said center and the interior of the left-hand end frame of the loom. Fig. 6 is a section in the line $y\ y$ of Fig. 2, showing the cam for moving the selvage-shuttle and actuating the lifters to move the carriages, and also the star-wheel to actuate the tuft-carriage-carrying chains intermittingly at variable speed; Fig. 7, a detail of the cam and link for actuating the weft-carriage and its carriers; Fig. 8, details of the interior of part of the pin and star wheels shown in Fig. 6. Figs. 9 and 10 are details of parts of the pin-wheel moving devices and clutch, the said parts being nearly all located at the left of the dotted line $yy$, Fig. 2; Figs. 11, 12, 13, and 14, details of the shuttle for locking the doubled weft and devices for operating it, the remaining devices being shown in Fig. 6 on a smaller scale; Fig. 15, a front view of one of the carrying-chains for the tufting-carriages, one of the links being broken out to show the flange for holding down the journal $e$ of the tufting-carriage; Fig. 16, a side elevation of one of the said chains and its connected tufting-carriages and devices to support the said chain and permit its links to be turned far enough to uncover the open bearings for the tufting-carriage journal, two of the links being broken out to show the flanged parts that cover the journals of the carriages; Fig. 17, details of a tufting-needle and spool to hold the tuft-yarn; Fig. 18, a sectional detail of one of the tufting-carriages; Figs. 19 and 20, details showing the spring to produce tension or friction on the periphery of the head of the tuft-yarn spool. Fig. $19^a$ is a detail showing a rear-side view of the spring which acts upon the head of the tuft-yarn spool. Figs. 21 and 22 are details of the devices for turning the free ends of the tuft-yarns down in front of the needles just after the latter descend below the warps and the tuft-yarns are severed from the fabric. Figs. 23, 24, 25, and 26 are details, on a large scale, of one of the lifters, which engages and lifts the carriages from their carrying-chains, the guide on which the lifter slides, and the arm which vibrates the guide and lifter. Fig. 27 is an enlarged detail of part of the front of the right-hand end of the loom, it showing the weft-carriage and actuating parts; Fig. $27^a$, a sectional detail of Fig. 27 at the left of the dotted line in said figure; Fig. 28, a right-hand end view of Fig. 27; Fig. 29, a top view of Fig. 27; Figs. 30 and 31, details of the latch for connecting the coarse-weft carrier with the tuft-weft carriage or holding it fixed to the loom; Fig. 32, details of the spindle which at times holds the sleeve of the coarse-weft carrier; Figs. 33 and 34, taken together, show the entire rear side of the guide-way $l^{10}$, on which the tuft-weft carriage runs; Fig. 35, detailed side and top views of the guide, tension, and take-up device for the tuft and coarse wefts; Fig. 36, details of the front end of the tuft-weft carrier and the arm which at times delivers the coarse weft to the notched end of the tuft-weft carrier; Fig. 37, details of the needles and sectional plates of the tufting-carriages; Fig. 38, a detailed side elevation and top view of the temple; Fig. 39, a front view of the pins of the temple; Fig. 40, details of the front end of the trough in which the pile-wire runs, it showing the devices to oil the knife at the end of the pile-wire. Figs. 41 to 45 show different positions of the warps and needles and reed when making a tufted fabric; Fig. 46, a longitudinal section of part of such a fabric on a large scale, with the wefts fully bent in, some of the weft-shots containing one and others two double threads. Fig. 47 shows separately the two links which in the chain alternately hold and release the journals of the tufting-carriages; Fig. 48, a diagram showing the chains and carriages carried by them as extended down into a pit or room below the loom-frame or floor on which it rests. Fig. 49 is a detail of the cam for operating the harness-lever which moves the stuffing-warp harness-frame; Fig. 50, a like view of one of the cams for operating the harness-levers which control the regular warps; and Fig. 51, a detail of the spring and collars for holding the shaft $a^4$ in one or the other of its positions, with the driving-pulleys closed or opened and unclutched.

The loom-driving or pulley shaft $a$, having its bearing at one end in one of the loom-sides A and its other bearing in a supplemental small end frame, $A^2$, is driven from a belt, B, (see Fig. 1,) on the loose part $a'$ of the friction or clutch pulley, which latter is of the same construction as that represented in United States Patent No. 197,754, December 4, 1877, the part $a'$ being thrown into engagement with or disconnected from that part $a^6$ of the said pulley which is fixed to the said shaft by means of the lever $a^2$ and link $a^3$, connected with a crank, 50, on the rocker-shaft $a^4$, having a hand-lever, $a^5$, (see Fig. 2,) by which to move it. When the crank 50 is as in Fig. 2, with the link $a^3$ extended across the center of shaft $a^4$, the pulley parts $a'$ $a^6$ are held closed together firmly, but without material strain on the shaft $a^4$.

A flat spring, 25, (see Figs. 1, 2, and 3 and detail Fig. 51,) having a depression or recess, 28, engages a projection on one of the collars 26 or 27 of the shaft $a^4$ and holds it firmly in either of its two positions.

The shaft $a$ is provided with a hand-wheel, $a^7$, by which to turn it by hand, and with a brake-wheel, $a^8$, which is acted upon at its periphery by the brake $a^9$ (see Fig. $3^a$) on a lever, $a^{20}$, pivoted at $a^{21}$, and operated through the connection $a^{19}$ by an arm, 52, of the rocker-shaft $a^4$, before referred to, the said brake being applied and the friction or clutch pulleys being disengaged simultaneously to enable the loom to be stopped instantly, the said brake being removed as the pulleys are engaged. This shaft $a$ has also a pinion, $a^{10}$, which engages a toothed wheel, $a^{11}$, on and drives the shaft 2, (see Fig. 2 and 3,) having a pinion, $a^{12}$, which, in turn, engages a toothed wheel, $a^{13}$, on the main cam-shaft $a^{14}$. This cam-shaft has a bevel-gear, $a^{15}$, which engages a bevel-gear, $a^{16}$, on a shaft, $a^{17}$, provided with a series of cams, 3 4 5, to be hereinafter referred to. (See Figs. 1, 2, 3.)

The shaft $a^{14}$ is extended across the loom between the loom-sides A A, and has upon its opposite end a bevel-gear, $b$, (see Fig. 2,) which engages a bevel-gear, $b'$, on the shaft $b^2$, provided with a series of cams, $b^3$ $b^4$ $b^5$, to actuate the series of heddle-levers $b^6$, pivoted centrally at $b^7$ near the loom-side A, and provided at bottom and top with holes for the adjustable connection therewith of the loops $b^8$, also provided with holes for the attachment and adjustment of the harness-cording $b^9$ $b^{10}$, which, extended over the usual sheaves, is connected with the harness-frames $b^{12}$ $b^{13}$ $b^{14}$ at bottom and top, (see Figs. 1, 2, and 4,) in such manner that the said frames, by the said connections, are at times lifted at both ends and at other times pulled down at both ends, which causes them to be moved evenly to raise and depress the warps uniformly. By means of these loops $b^8$ the heddle-frames may be so adjusted as to insure the proper depth of shed, and at the same time also insure the formation of the center of the warp-shed in proper position with relation to the line of reciprocation of the weft-carrying needle, to be referred to.

The shaft $b^2$ has a bevel-gear, $b^{15}$, which engages a bevel-gear, $b^{16}$, one-half its size, loose on the short shaft $b^{17}$, (see Figs. 1, 2, 6, and 10,) but connected thereto by a clutch device, shown as a pin, 7, held in an arm, 70, fixed on shaft $b^{17}$. This short shaft $b^{17}$ has splined upon it a pin-wheel, $b^{18}$, which engages the star-wheel $b^{19}$, secured to a shaft, 6, extended across the loom in front of the lay, and provided at its opposite ends with toothed wheels $c\ c$, which engage the pinions $c'\ c^2$ (see Figs. 2 and 6) on two short but like shafts, $c^3$, one of which is shown clearly in Figs. 4 and 16, the shafts $c^3$ being supported in suitable bearings located within the loom-sides A, the said gears being, however, outside the loom-frame. These short shafts $c^3$ have at their inner ends narrow chain-wheels $c^4$, each of which receives and moves one of the two similar tufting-carriage-moving chains $c^5$, which, as hereinafter described, carry the tufting-carriages, to be referred to. The chain-wheel is of such size and the faces of its periphery are so shaped with relation to the links of the said chains as to open their joints at the tops of the wheels, when the wheels are as in Fig. 16, far enough to permit the removal of the carriage-journals $e$ therefrom, as will be described. The space between the inner sides of the chain-wheels is left unobstructed, so that the carriages carried by and pivoted upon the said chains may hang down or remain in upright position (see dotted lines, Fig. 16) as the said carriages are moved across the center lines of the shafts $c^3$. The shaft $a^{14}$ makes one revolution during the introduction and securing of each row of tufts, and the shaft $b^2$ is operated in unison with it at the same speed.

The shaft 6, which moves the chains $c^5$, must be moved intermittingly, and but for one-sixth of a revolution during each complete rotation of shafts $a^{14}$ and $b^2$. Shaft 6 must remain at rest long enough after the chains $c^5$ bring each tufting-carriage $c^6$ into position to permit the carriage to be removed from the bearings in the said chains preparatory to having its tufting-needles $c^7$ projected or raised between the warps.

The star-wheel $b^{19}$ derives its intermitting movement from the pin-wheel $b^{18}$, which moves twice as fast as the shaft $b^2$, thus operating the star-wheel quickly and leaving it at rest for the longest possible time, to thus give the greatest amount of time in which to remove and replace the tufting-carriages $c^6$. This pin-wheel, splined, as described, on shaft $b^{17}$, is embraced by a yoke, $c^8$, (see Fig. 10,) secured to a slide-bar, $c^9$, guided by a stand, $c^{10}$, (see Figs. 2 and 6,) the forked end of the said slide-bar $c^9$ embracing the shaft $b^2$, as in Fig. 9, and having a pin, $c^{12}$, which enters a groove in the face of the cam $c^{13}$ on the said shaft $b^2$. The said cam $c^{13}$, operating the rod $c^9$ at the proper time, withdraws the pin $c^{14}$ of the pin-wheel from the slot of the star-wheel, thus leaving the latter and shaft 6 at rest until the star-wheel is again engaged by the said pin-wheel. This arrangement for withdrawing the pin from the star-wheel, and thereby preventing its movement every alternate revolution of the pin-wheel, is for the purpose of moving the star-wheel and parts connected to it only once for each revolution of the shafts $b^2$ and $a^{14}$, said pin-wheel being so geared as to move two revolutions to one of the shaft in order to move the star-wheel and connected parts quickly, as before described. This pin-and-star-wheel connection is also of especial advantage, because it enables said chains to be started slowly and moved rapidly nearly into position, the movement of the chains being stopped slowly to avoid too great momentum.

When it is desired to turn the chains backward or forward independently by hand while the other parts of the loom are at rest, the clutch device 7, Fig. 10, may be withdrawn from the gear $b^{16}$, and by applying a crank (not shown) to the squared end of the shaft $b^{17}$ the latter and its connected train of parts and the chains $c^5$ can be turned freely in either direction.

The chain $c^5$ (shown in Figs. 4, 5, and 16 on a large scale) is broken out, and a lower bent portion of the said chain is brought up in the last-mentioned figure to show the guide-wheel $d$, under which the lower portion of the said chain runs, the said guide-wheel being placed loosely on suitable studs. In practice these chains $c^5$ will be of greater or less length, according to the length of the pattern in the fabric being woven, as there must be a tuft-carriage and a series of needles and spools for each row of tufts composing the pattern. To enable the said chains to be properly moved and contained outside the loom-frame and leave a free space between the loom-sides at the rear of the lay $d^2$ to be utilized for the harness-cording, cam-shaft, its cams, warp-beams $d^3$ $d^4$ for the regular warps 8 9, and the usual warp-rollers and let-off and tension devices, the said chains have been extended downward, as in Fig. 48, into a pit or into a room below the floor $d^5$, on which the loom-frame A stands.

In Fig. 48 the long chain is shown as extended over a series of wheels, $c^4$, on shafts $d^6$, which, in practice, will be driven positively in unison with and from the shaft 6 by suitable shafting and gearing, not necessary to be herein shown.

The chains $c^5$ are composed of a series of pairs of links, 10 12, pivoted together at $d^7$, and shown separately in Fig. 47, there being a pair of links for each journal of each tufting-carriage $c^6$. The links 12 have open bearings 13, and the links 10 have enlarged parts 14, with flanges 15, (see also Figs. 15 and 16,) which are shown in dotted, in section, and in full lines. The journals $e$ of the tufting-carriages $c^6$ are placed in the open bearings 13, from which they can be removed, when the carriage with its needles is in an upright position and the chain is bent, as shown at the top of Fig. 16, far enough to remove the flange 15 of the link 10, (shown in dotted lines,) from above the open bearings 13, (also shown in dotted lines.) When the links are sufficiently straightened to bring the flanges 15 over the journals $e$ in the said bearings 13, then the journals $e$ are held securely in the said bearings and travel with the chains. Fig. 16 shows two of the flanges in section, they holding the journals in the said bearings 13. The journals are provided with annular grooves to fit ribs 16 of the bearings 13, (see Fig. 15,) the grooves and ribs preventing the said journals from slipping out laterally from the bearings 13.

Each tufting-carriage $c^6$—one for each row of tufts in the pattern of the fabric—has a socketed cross-bar, $d^8$, (see Figs. 17, 18, and 37,) which receives the short sectional plates $d^9$, to which are soldered the needles $c^7$, the said plates being removably attached to the said cross-bar by the screws $d^{10}$. These plates $d^9$ are provided with grooves at one side, as in Fig. 37, to correctly space the needles $c^7$, and being attached by solder, as described, a needle on any one sectional plate, the latter removed from the cross-bar, may be readily detached by melting the solder, and a new needle may be applied to the plate.

Each carriage has bearings $d^{12}$ to receive the journals $d^{13}$ of the spools or beams which hold the tufting-yarns $x$, each spool having a sufficient number of yarns to supply the series of needles secured to the carriage, the yarns on the same spool being of different colors, arranged in a particular order, according to the colors of the tufts in the row of tufts to be made from the yarn of a particular spool. The yarns $x$ are passed over or about the tension-rods $d^{15}$, and thence upward along the interior of the needles, and thence out through their eyes, as in Figs. 17 and 41 to 45. The peripheries of the heads of the spools $d^{14}$ are acted upon by flat springs $d^{18}$, (see Figs. 16, 19, 20,) which act as brakes for the said spools, the force of the said springs being controlled by the adjusting devices $d^{20}$, (shown as screws.) These springs are bent, as shown in Fig. 19, to form a notch to rest on a cross-pin, 71, (see Figs. 19 and 19a,) suitably supported by and between lugs 72, extended from the side plates of the carriage.

Each carriage $c^6$, at its outer side, has a stud, $d^{16}$, which, as each carriage approaches its uppermost position, enters carriage-guideways $d^{17}$ and $d^{27}$, (see Figs. 4 and 4a,) which act to so maintain or hold the carriage that its needles will remain in vertical position, while the lifting devices $e^3$ (see Figs. 23 to 25) act upon the journals $e$ thereof to lift the said carriage $c^6$ from the open bearings 13. The descending needles are kept in vertical position by the spring-plate $e^2$, attached to the floor $d^5$.

The journals $e$ of a tuft-carriage, when the chains $c^5$ bring a carriage into the position shown at the top of Fig. 16, are acted upon by the carriage-lifters $e^3$, (one at each side of the looms, see Figs. 23 to 26,) forked at top and fitted to slide vertically on the lifter-guides $e^4$, which rise from and turn loosely on the short studs $e^5$, which also serve as the pivots of the swords of the lay $d^2$. Each guide $e^4$ has joined with its hub $e^7$ an upwardly-extended arm, $e^8$, (shown clearly in Fig. 24,) which at its upper end is joined by a link, $e^{10}$, with an arm, $e^{12}$, of a sleeve, $e^{13}$, (shown in section Fig. 5,) on a rocker-shaft, $f$, (see also Fig. 2,) a longer arm, $e^{14}$, of the said sleeve being acted upon by a cam, $e^{15}$, to rock the sleeve and vibrate the arm $e^8$, guide $e^4$, and lifter $e^3$ far enough to move the tufting-carriage for a sufficient distance horizontally to permit the needles $c^7$ to assume in the shed the different positions indicated in Figs. 41 to 45. The pin $e^9$ on the arm $e^8$ enters the slot $e^{16}$ (see Fig. 25) of the lifter $e^3$ and steadies it in its movements.

The lifters are raised and lowered to act upon the journals $e$ and lift a tuft-carriage from the open bearings 13 by means of the links $f^2$, (see Figs. 1, 4, and 24,) connected with arms $f^3$ of the rock-shaft $f$, before referred to, it having another arm, $f^4$, joined by link $f^5$ with the lower end of a radius-bar, $f^6$, having a stud or roller acted upon by a cam, $f^7$, the stud or roller on the said radius-bar being held against the said cam by the weight $f^8$ and its connected chain, (shown in Fig. 5.) An adjustable portion, $t$, of cam $f^7$ acts at proper times to move the lifters to slightly elevate the carriage held by them to tighten the tuft-yarns $x$ about the tuft-weft, and an adjustable portion, $t^2$, at other times pulls the carriage down to strain the yarns $x$ about the pile-wire $p$ and draw from the spools sufficient yarn to form another series of tufts.

When the journals $e$ of a carriage are uncovered, as they will be when the chains are bent about the chain-wheel, as at the top of Fig. 16, the same journals $e$ are prevented from moving up out of the open bearings 13 by the guides $f^9$, the latter, however, having an open space or bend, as shown clearly in Figs. 4 and 5, to permit the journals of the carriage acted upon by the lifters $e^3$ to be raised above the top of the said guides or guards. As the carriage is moved over the top of the chain-wheel the pins or studs $d^{16}$, as they leave the guide $d^{17}$, enter a second curved guide, $d^{27}$, (see detail Fig. 4$^a$,) located at the rear of the guards $f^9$, which continues to keep the needles perpendicular. The arms $e^8$, at their outer sides, near their tops, and just below the points of connection of the links $e^{10}$ with them, are provided with lips 29, (see Fig. 4,) which engage a guide, 30, forming part of the rigid bearing 31 for the shaft $c^3$, the said lip and guide preventing movement or vibration of the arms $e^8$ or lifters crosswise of the loom, which would so move the needles that in rising they would not always enter between the proper warp-threads. To insure yet greater certainty that the needles in rising shall always enter between the proper warp-threads, the lay has been provided with gibs 32, (see Fig. 4,) which are fitted to run snugly against smooth flat surfaces at the inner sides of the loom-frame. As the lifters $e^3$ rise to embrace the journals $e$, sockets $g$, attached one to each lifter at its inner side, (see Figs. 23 and 24,) engage the tufting-carriage at its lower ends, $g'$, and as the lifters $e^3$ raise the carriage from the chains the springs $g^2$ pass beyond the ends of the adjustable cam-plates $g^3$, secured to the guides $e^4$, (see Figs. 5 and 23,) and permit the said springs to move in the direction of the arrow 20, Fig. 23, and thrust the carriage-locking devices $g^4$ (shown as pins) through holes in the sockets $g$, so as to lock the carriage to the lifters.

There is a lifter and mechanism to operate it at each side of the loom, so as to engage and lift each end of the tufting-carriage.

The lay $d^2$, cam $h$, crank $h^5$, links $h^2$ $h^3$ to move the lay, as shown in Fig. 4, are not claimed in this application, as they are not of our invention.

The cam $h$ gives three beats to the lay during each rotation of the cam-shaft $a^{14}$, to enable the lay to beat up the filling or weft, as will be hereinafter described.

The stuffing-warp 21 is taken from the warp-beam $h'$ (shown in Figs. 4 and 5) and extended under the whip-roll $h^4$. The stuffing-warp threads are led through the eyes of the heddles 22 in the narrow harness-frame $b^{12}$, actuated by one of the levers $b^6$, moved in the proper time by the cam $b^3$. (Shown in detail, Fig. 49.)

In the drawing of the fabric (see Fig. 46) the stuffing-warp threads 21 are shown in dotted lines as laid in loosely to fully show it; but in a woven fabric for use the said warp-threads will occupy nearly a straight-line position. The threads of the warp 8 are led through the eyes of the heddles 23 in the harness-frame $b^{14}$, which is moved from the cam $b^5$, (see Fig. 50,) while the threads of the warp 9 are led through the eyes of the heddles 24 in the harness-frame $b^{13}$, moved at the proper time by the cam $b^4$.

The heddle-frames $b^{13}$ and $b^{14}$ are shown as twice as thick as frame $b^{12}$, to assist in separating or spreading the warps.

The cams $b^3$ and $b^4$ are of like shape; but one has a little more throw than the other to even the shed.

The carpet or fabric to be woven on this loom has two doubled shots of filling thread or weft, $l$ $m$, one or both of which may be inserted in the same warp-shed. These threads are supplied from bobbins or cops $l'$ $m'$, fixed to the loom-frame, and as herein shown are extended through guides $l^2$ under tension-springs $l^3$, thence through eyes in pivoted take-up arms 33, which serve to take up slack in the said weft-threads, and then to the guides $l^4$ $m^2$.

The thread $l$, hereinafter denominated the "tuft-holding weft," is led through the guide $l^4$, thence about the roller or sheave $l^5$, through the hollow weft-carrier $l^6$, and out through an eye, $l^7$, therein (see Fig. 36) into the warp-shed, the head of the said needle being preferably notched, as at $l^8$, for the entrance of the shuttle $n$ (see Figs. 12, 13, and 14) into the loop of the tuft-holding weft-thread, the said shuttle passing its thread through and locking the said loop of tuft-weft at one selvage of the fabric, as will be hereinafter described, but which is not of our invention.

The hollow or tubular weft-carrier $l^6$ is connected at its rear end with a sliding carriage, $l^9$, fitted to slide on a stationary guideway, $l^{10}$, the carriage $l^9$ being connected by link $l^{11}$ with the lever $l^{12}$, having a fixed pivot at $l^{13}$, (see Fig. 7,) the said lever being joined by link $l^{14}$ with the radius-bar $l^{15}$, pivoted to the framework at $l^{16}$, and provided with a roll, which is acted upon by a cam, 3, on the shaft $a^{17}$, before referred to; but this we do not claim.

The carrier $l^6$, near its forward end, is fitted to slide in a guide or bearing extended forward from the guideway $l^{10}$, as shown in Fig. 2. The front end of the carrier $l^6$ is forked or notched at 43, as shown clearly in Fig. 36, to receive at proper times the weft-thread $m$, before referred to, it being a coarse strong weft-thread. This coarse weft-thread $m$ is passed through the guide $m^2$, secured to a sleeve, $m^{13}$, and thence about the sheave $m^3$ through a second guide, $m^4$, (see Fig. 29,) and thence through an eye in the coarse-thread controller $m^5$, connected with a rocking shaft, $m^6$, (see Fig. 36,) parallel with the loom-side, and held in a bearing, $m^7$, (see Fig. 2,) at the inner end of the guideway $l^{10}$. This rocking shaft $m^6$ (see Fig. 2) has an arm, 55, (see Fig. 34,) connected by link $m^8$ with an elbow-lever, $m^9$, (see Fig. 33,) which is forked at its outward end and embraces the vibrating arm $m^{10}$, connected with a link, $m^{11}$, jointed at its lower end with a lever, $m^{12}$, acted upon by a cam, $m^{13}$, the movement of the arm $m^{10}$ by the cam and lever turning the lever $m^9$ and causing the link $m^8$ to move the coarse-weft controller $m^5$ so as to rise and fall at the proper times to place its thread in the path of the forked part 43 of the filling-thread carrier $l^6$ during its forward movement, thus enabling the said carrier to engage the weft $m$ and carry it doubled through the shed, together with the tuft-weft $l$, both doubled shots being locked in the same shed by the thread of the shuttle $n$. Both weft-threads are carried through the same shed at every third shed, but at all other times only the filling $l$ is employed in the shed. The cam 3, which operates the filling-carrier $l^6$ is so shaped that it draws the carrier at each third movement back far enough to catch the thread $m$.

The sleeve $m^{13}$, which carries the guide $m^2$, sheave $m^3$, and guide $m^4$, is provided at its inner side with a spring-latch, $m^{14}$, and the sleeve is provided with an opening to fit the head $m^{16}$ of the rod $m^{15}$, (see Fig. 32,) the said sleeve being retained on the said rod when the latch $m^{14}$ engages the projection $m^{17}$ on the bearing $m^{18}$, as in Fig. 30. This bearing $m^{18}$ is fixed by bolt $m^{19}$ to the guideway $l^{10}$. (See Figs. 27 and 28.)

The sleeve $m^{13}$ has a beveled or gib-like foot, $m^{20}$, which is adapted to enter a correspondingly-shaped groove, $m^{21}$, at the upper side of and be moved forward by the carriage $l^9$ whenever the latch $m^{14}$ is disengaged from the projection $m^{17}$, before referred to, this happening at every third shot of filling, or when the thread $m$ is to be introduced into the shed. The shape of this foot is indicated in cross-section in Fig. 27ª.

The carriage $l^9$ has a notch, $o$, near one end, into which the inner hook of the latch $m^{14}$ is engaged when it is desired to move the sleeve $m^{13}$ forward. When the said sleeve is held locked to the bearing $m^{18}$, as in Fig. 30, the force of the spring $o'$, fixed to the guide $m^2$ of the sleeve $m^{13}$, is overcome by the latch-holder $m^{22}$, (shown as a lever,) pivoted at 34 on a part of the bearing $m^{18}$, the latch-holder being held, as in Fig. 30, by the arm $m^{10}$, then kept elevated, as in Fig. 28, by the cam $m^{13}$. With the latch so held it is obvious that the carriage may be reciprocated without the hook at the inner end of the latch dropping into the notch $o$; but at each third shed, when both wefts $l$ $m$ are to be introduced together, the arm $m^{10}$ is moved in the direction of the arrow 35, Fig. 28, to release the outer weighted end of the latch-holder $m^{22}$, when the latch-holder turns on its pivot 34 and unlocks the latch, so that as the notch $o$ of the carriage $l^9$ next comes under the hook at the inner end of the latch $m^{14}$ the spring $o'$, acting on the latch, throws the inner hook thereof into the notch $o$, as in Fig. 31, and releases the opposite hook of the latch from the projection $m^{17}$, after which the sleeve $m^{13}$ and its attached parts will be moved forward by and with the carriage $l^9$; but at the next outward movement of the said carriage the arm $m^{10}$ will be lifted and cause the latch-holder $m^{22}$ to again engage the latch $m^{14}$ with the projection $m^{17}$ and again hold the sleeve $m^{13}$ stationary, while the carriage $l^9$ is next moved forward twice for the introduction of two shots of the weft $l$ in two different sheds.

The carriage $l^9$ has a friction-roller, 36, which is extended across and so as to roll on a concaved spring, 37, the roller running upon the highest portions of the said spring as the carriage approaches its extreme positions, the said spring serving to hold the said carriage and prevent any movement thereof except when actuated positively. Such a spring and carriage are, however, old. The spring 37 is attached centrally by a bolt, 38, to a bracket, 39, bolted to the guideway $l^{10}$. The pile-wire $p$, having a knife, $p'$, at its front end, is rigidly connected, as usual, with a pile-wire carriage, $p^2$, mounted on a swinging guide-rail, $p^3$, secured to the upper ends of arms $p^4$ of a rock-shaft $p^5$. The rock-shaft $p^5$ has an arm, $p^6$, provided with a roller, 40, which is pressed by a strong spring, 41, against the face of the cam 5, which cam acts to swing the rail $p^3$ backward and forward in the direction of the length of the warp. The pile-wire carriage is reciprocated on the rail $p^3$ by the link $p^7$, lever $p^8$, link $p^9$, and radius-bar $p^{10}$, the latter having a stud or roller acted upon by the cam 4. (See Fig. 1.)

The let-off and take-up mechanisms are substantially as in English Patent No. 505 for the year 1855, so they will not be specifically described.

The lever 56 enters into the take-up mechanism to operate a clutch to disconnect the take-up roller from its train of gearing, if it be desired to turn it backward by hand.

The fingers 44 (see Figs. 23 to 25) strike against the rear sides of the carriages $c^6$ as the latter pass them and insure the entrance of the studs or rollers $d^{16}$ into the guides $d^{17}$.

Referring to Figs. 21 and 22, we have shown detached from the machine the yarn-depressing mechanism which we have devised to turn down or depress the ends of all the tuft-yarns in front of the needle $c^7$. This yarn-depressing mechanism is herein shown as a pivoted frame having two cross wires or rods, $r$ $r'$, the latter of which is by link $r^2$ connected with lever $r^3$, acted upon by a cam, $r^4$, on the cam-shaft $a^{14}$, (see also Fig. 4,) a spring, $r^5$, keeping the lever up to the said cam. As the needles $c^7$ descend the tufting-yarns are extended upward, as shown by the heavy black line, Fig. 22; but as soon as the points of the said needles pass below the rod $r$ the latter is swung or thrown down, as in dotted lines, Fig. 22, while the needles remain at rest and depress or turn down the ends of all the tuft-yarns, as in dotted lines in Fig. 22, the ends of the said yarns remaining in such position until the said row of needles has been again elevated between the warp-threads, the said ends being turned outward, as in Fig. 45, as soon as the needles begin to descend.

The shuttle $n$, carrying the thread for locking the weft or filling thread, is placed in a raceway, $n'$, (see Figs. 12 to 14,) and is engaged by pins $n^2$ of fingers $n^3$, pivoted on the shuttle-moving carriage $n^4$, the said pins being alternately engaged with and disengaged from the shuttle as the fingers are reciprocated over and in contact with the cam-ledges $n^5$ $n^6$, (shown in full and dotted lines in Fig. 13,) this being necessary to permit the shuttle to pass through the loops of and lock the filling thread or threads. The fingers are kept down upon the said ledges by the springs $n^7$. Such fingers and cam-ledges are common in sewing-machines.

The carriage $n^4$ is connected by link $n^8$ (see also Fig. 6) with a lever, $n^9$, acted upon by the toes $n^{10}$ of a three-toed cam secured to shaft $a^{14}$, the lower end of the said lever $n^9$ being held against the said cam by a spring, $n^{12}$.

The shuttle-race frame has a guide or loop, $n^{13}$, to receive the end of the filling needle or carrier $l^6$, and a support, $n^{14}$, for the thread $n^{15}$ of the shuttle $n$ (see Fig. 13) as the latter descends, thus preventing it from drawing down the selvage-threads.

The temple shown keeps the selvage-warps next the shuttle $n$ straight, so that the endmost needle will always rise correctly just inside the selvage-warps, and at the same time so holds the said selvage-warps that they cannot be drawn in by the backward pull of the filling. This temple has one or more selvage-pins, $s$, which rest between the selvage-warps and keep them apart or separated and hold them against lateral displacement.

The selvage-pins $s$ are attached to an arm, $s'$, pivoted at $s^2$ on an ear, $s^3$, of a slide-rod, $s^4$, guided in a frame, $s^5$, bolted upon the inclined breast-beam $s^6$ and surrounded by a spring, $s^7$. The frame $s^5$ has a projection, $s^8$, which is struck by the top bar, $s^9$, of the reed $s^{10}$ or lay at each forward beat of the lay, lifting the said projection and arm, as in dotted lines, lifting the pin $s$ from between the selvage-warps, so as to slip over the weft in the warps in advance of it toward the reed.

The fabric to be made on this loom is shown in longitudinal section, Fig. 46. In the said figure, $x$ designates the tufts formed from the tufting-yarn, (marked $x$ in Figs. 41 to 45.) The tufts $x$ are bent about and held in place in the fabric by a double shot of tuft-weft $l$, it being laid in the second shed, but above rather than below the stuffing-warps 21, (shown in dotted lines, Fig. 46,) so that as the tufts and the weft holding them are beat up in the shed the said weft is moved into position above the previously-inserted tuft-weft, the latter serving as an under support for the tufts. The intermediate shed between adjacent tufts is filled with doubled shots of the tuft-weft $l$ and backing-weft $m$.

Referring to Fig. 45, indicating the second shed, it will be seen that the tuft-yarn $x$ is elevated above the warps, and that the first shot of doubled weft $l$ has been inserted in the shed above warp-threads 8 and below warp-threads 9 and 21. The first shot of weft $l$ (shown immediately in front of the needles $c^7$) was laid into the warp-shed when in the condition Fig. 44, and was partially beat up by the reed $s^{10}$ while one tuft-carriage was being placed back in the carrying-chains and another carriage (the one shown in Fig. 45) was being lifted from the chains. As the said first weft $l$ was partially beat up the stuffing-warp 21 was lowered, making the second shed, and thereafter the needles $c^7$ of the tuft-carriage next to be used were elevated sufficiently, as in Fig. 45, to bring the free ends of the tuft-yarns $x$ above the warps, and the carriage and needles were moved forward against the filling in front of them, after which the second shot of filling was thrown into the shed between warps 9 and 8, but this time above the stuffing-warp 21. Just before the weft $l$ emerged from the opposite selvage to that at which it entered the warp-shed the descent of the needles was commenced, the points of the needles being nearly withdrawn from the warps when the filling-thread carrier (its loop of thread $l$ having been entered by the thread of the shuttle $n$) started back, and as the needles arrived at the position Fig. 41, the second shot of tuft-weft $l$ was left in the shed above the stuffing-warp and warp 8, and below the warp 9, when the second beat of the lay took place and crowded the second doubled shot of tuft-weft forward against the ends of the tuft-yarn held between the warps, and as that beat of the lay was completed the harness-frames were again changed to lift the warp 8 and depress warp 9. Just before the tuft-weft $l$ was beat up tight against the ends of the tuft-yarns the tuft-carriage was drawn down a little to draw down all the ends of the tuft-yarns and leave them just at the proper distance above the warps, according to the length of the pile to be formed. The shed having been changed, as described, the needles of the same carriage (they occupying the position Fig. 41) are moved horizontally backward and elevated between and above the warp to the rear of the second shot of tuft-weft $l$, laid in the shed above the stuffing-warp 21, as in Fig. 42, thus elevating the tuft-yarns above the open shed of the warps, leaving two sheds, one between the tuft-yarn and warp 8 for the pile-wire $p$, and the other between the warps 8 9, to receive the weft-carrier $l^6$, which, at this third forward movement or shed in the warps 8 9, receives the coarse weft $m$ in its hook 43 and leaves the doubled wefts $m$ and $l$ in that shed in front of the needles $c^7$.

In Fig. 42 the shed, needles, and tuft-yarns are shown in the position they will occupy just before the weft-carrier $l^6$ is fully withdrawn from the warp-shed. While the needles are as in Fig. 42 the carriage and needles are temporarily lifted about one-quarter of an inch by the adjustable cam-projection $t$, (see Fig. 6,) in order to tighten the tuft-yarns about the tuft-weft $l$, which is to hold the tufts into the fabric and leave sufficient space for the entrance of the pile-wire $p$. Just as the needles reach their highest position the pile-wire $p$ is thrown forward into the shed formed between the tuft-yarns and the elevated warp 8, the filling-thread carrier being simultaneously withdrawn from the shed, and as the latter emerges from the shed the needles are moved forward toward the breast-beam, pushing the two doubled shots of weft $l$ in front of them, as does a reed, and the needles $c^7$ are then drawn down below the warps, folding the tuft-yarns about the pile-wire and about the two doubled shots of filling, as in Fig. 43, and the lay is then moved forward on its third beat bringing the reed $s^{10}$ against the tuft-yarns and the two doubled shots of filling, beating them closely into the warp-crossing, the reed at the same time forcing the second shot of tuft-weft (shown in Fig. 41 at the rear of the yarns $x$, and in Figs. 42 and 43 between the legs of the tuft) forward into position above the first doubled shot of tuft-weft, so that the two independent shots of tuft-weft $l$, one below and the other above the stuffing-warp 21, will be made to fall one above the other, as shown in Fig. 46, at the left. The needles having been drawn down to strain the tuft-yarns over the pile $p$, the lay recedes a little, and the carriage and needles $c^7$ are pulled down for a short distance by the adjustable plate or cam $t^2$, secured to the cam $f^7$, (see Fig. 6,) such additional downward pull on the yarns $x$ straining them about the pile-wire, the descent of the tuft-carriage being sufficient to also strain the yarns, turn the spool $d^{14}$, and pull off sufficient material to form another row of tufts. While the lay makes this small recession in its third beat, the shed is changed from the position Fig. 43 to that shown in Fig. 44, and the lay goes forward to complete its third beat, where it remains holding the tuft-yarns $x$ closely about the pile-wire $p$, until the pile-wire is withdrawn, its knife $p'$ cutting the yarns $x$, leaving tufts such as shown in Figs. 44 and 46. The yarns $x$ having been cut, the reed $s^{10}$ recedes to the position shown in Fig. 44, and the filling-carrier $l^6$ is again moved forward into the shed in front of the reed, to again lay a first shot of filling $l$ under the warp 9 and stuffing-warp, as first described. When the needles are fully drawn down, as in Fig. 44, the reed is made to press up the filling $l$, another carriage is brought into position, its needles are elevated, and the shed is changed, as in Fig. 45.

In Figs. 41 to 45 the threads are not shown as massed or beat together as closely as they will be in the fabric, but are left loose to clearly show the contents of each shed. In practice, however, the wefts will, when fully beat up, be as in Fig. 46, where the single and double shots of filling are shown in section.

Each link 10 is pivoted to a link, 12, at the rear of the open bearing 13 by a pivot, which will preferably be cast with the link 12, the said pivot receiving upon it the central portion of the enlarged part 14 of the link 10, as clearly shown in Figs. 16 and 47.

The pile-wire-oiling device, Fig. 40, is composed of a loop, 73, of wire, attached by screw 74 to rail $p^3$, the legs of the loop being wound with flannel or cloth, upon which oil is applied at the desired times.

We claim—

1. In a loom for weaving tufted fabrics, two endless chains located below the warps, and having open bearings 13 and flanges 15, the chain-wheels $c^4$, and means to move them and the said chains intermittingly, leaving the bearings 13 uncovered just below the warps, combined with a series of carriages provided with journals to enter the said open bearings, and to be held down thereon at times by the said flanges, and a series of eye-pointed needles and tuft-yarn spools carried by the said carriages, substantially as described.

2. In a loom for weaving tufted fabrics, a series of carriages, needles, and yarn-holding spools, and two endless carriage-carrying chains having links provided with open bearings 13 and covering-flanges 15, combined with the two short shafts $c^3$, suitable means to operate them, and the chain-wheels $c^4$ at their inner ends, the said chain-wheels being shaped to open the links of the chain at their joints and uncover the journals of the carriages pivoted upon the said chains, the said carriages being adapted to remain in upright position and cross or pass the centers of the said short shafts $c^3$ when moved by the chains, substantially as described.

3. The two endless chains composed of links having open bearings and covering-flanges, as described, the series of carriages pivoted on the links of the said chains, and the needles and tuft-yarn spools connected with the carriages, the chain-wheels $c^4$ to support the said chains and open their links at their joints to uncover the journals of the said carriages, and means to move the said chain-wheels intermittingly, combined with lifter-guides and lifters thereon to engage the journals of the carriages, and with means to reciprocate the said lifters to lift the said carriages from the said chains and again replace them in the said chains below the warp, substantially as described.

4. The two endless chains composed of links having open bearings and covering-flanges, as described, the series of carriages pivoted on the links of the said chains, and the needles and tuft-yarn spools connected with the carriages, the chain-wheels $c^4$ to support the said chains and open their links at their joints to uncover the journals of the said carriages, and means to move the said chain-wheels intermittingly, combined with lifter-guides and lifters thereon to engage the journals of the carriages, and with means to reciprocate the said lifters to lift the said carriages from the said chains and again replace them in the said chains below the warp, and with means, substantially as described, to vibrate the lifters and the carriages about a horizontal axis, substantially as and for the purpose set forth.

5. The combination of two endless chains having open links and covering-flanges, and a series of tufting-carriages, needles, and spools carried thereby, with means to support and move the said chains vertically and intermittingly in front of the lay under the warps, and to project the needles above the warps to form tufts, as described.

6. The endless tuft-carriage-carrying chains, short shafts $c^3$, chain-wheels $c^4$, a cross-shaft, 6, and suitable gearing between the said shafts 6 and $c^3$, combined with the star and pin wheels and means to operate the pin-wheel, whereby the said chains are actuated intermittingly at a variable speed, substantially as and for the purpose described.

7. The shaft $b^2$, to impart movement to the shed-forming devices, the endless tuft-carriage-carrying chains composed of links having open bearings and covering-flanges, shaft $b^{17}$, and intermediate connections to operate the said chains intermittingly from the shaft $b^{17}$, combined with a clutch to disconnect the shafts $b^{17}$ and $b^2$, to permit the shaft $b^{17}$ and the parts which move the said chains to be operated while the shaft $b^2$ remains at rest, substantially as described.

8. In a loom for weaving tufted fabrics, needle-holding plates, grooved, as described, to space the needles, combined with the eye-pointed needles attached to the said plates in the said grooves, substantially as described.

9. The tufting-carriage having the grooved cross-bar $d^8$, as described, combined with the sectional needle-holding plates $d^9$ and attached needles, substantially as and for the purpose described.

10. The shafts $c^3$, the wheels $c^4$ thereon, and means to move the said shafts, the gears $c'$ $c^2$, and the shaft 6 and its two gears $c$, the star and pin wheels, and means to move the pin-wheels, combined with the cam, means to move it, and the link to withdraw the pins of the pin-wheel from the spaces of the star-wheel, substantially as described.

11. The chains $c^5$, composed of the links 10, having the flanges 15, and of the links 12, having the open bearings 13, the carriages $c^6$, mounted on the said chains and provided with studs or projections $d^{16}$, combined with the guides to receive the said studs and maintain the said carriages in upright position, and with means to move the said chains, substantially as described.

12. In combination, the lifters $e^3$ and tufting-carriages, their attached needles, guides $e^4$, on which the lifters are fitted to slide, the arms $e^8$, and means to vibrate them and the said guides to cause the carriages and needles to be moved horizontally with relation to the length of the warp, the pile-wire, means for operating it, the cam $f^7$, provided with the adjustable section $t^2$, to strain the tuft-yarns about the said pile-wire, and suitable intermediate devices between the cam $f^7$ and lifter $e^3$ to raise and depress the latter, substantially as described.

13. The endless chains, means to move them, the series of carriages thereon, having journals $e$, mounted in the bearings 13 of the chain-links, and provided with studs $d^{16}$, combined with the guides to receive and guide the said studs as the carriages approach the warps to be lifted from the chains, and with the guide $f^9$ to hold the said journals down in the open bearing after the flanges 15 have been partially removed from above the journals of the carriages, substantially as described.

14. The carriage $l^9$, its guideway, and means to move the carriage, the sleeve $m^{13}$, the rod $m^{15}$, and the bearing $m^{18}$ to hold the said rod, combined with the latch connected with the said sleeve and adapted to be engaged with the carriage or with a projection on the said bearing, to permit the sleeve to be carried forward with the carriage $l^9$ or to remain at rest, substantially as described.

15. The sleeve $m^{13}$, rod $m^{15}$, the bearing $m^{18}$ for the said rod, the latch, and the spring $o'$, combined with the latch-holder, arm $m^{10}$, and means to turn the said arm substantially as described, to move the latch and cause it to engage a projection on the said bearing, substantially as set forth.

16. The weft-carrier $m^2$ for the coarse weft, the sleeve $m^{13}$, the rock-shaft $m^6$, its connected thread-controller $m^5$, link $m^8$, lever $m^9$, the arm $m^{10}$ and means to move it, the rod $m^{15}$, the carriage $l^9$, means to move it, and the latch-holder, combined with the latch and the spring to engage it with the carriage, substantially as described.

17. The combination, with needles $c^7$, of the tuft-yarn-depressing rod $r$ and means to move it to depress the tuft-yarns upon the edges of the needles, substantially as described.

18. The chain composed of links 12, having open bearings 13, and links 10, having flanges 15, the links 10 12 being pivoted together by a pivot at the rear of the open bearing, substantially as described.

19. The chain-links 12, having open bearings 13, provided with ribs or projections 16, combined with the carriage and its journals $e$, provided with grooves to receive the said ribs and prevent the journals being drawn laterally out from the said bearings, substantially as described.

In testimony whereof we have signed our names to this specification in the presence of two subscribing witnesses.

GEO. CROMPTON.
HORACE WYMAN.

Witnesses:
J. HENRY HILL,
HENRY E. HILL.